Jan. 25, 1966 C. E. UPPER 3,231,223
FLIGHT ATTITUDE CONTROL SYSTEM
Filed Nov. 16, 1962 3 Sheets-Sheet 1

INVENTOR.
CHARLES E. UPPER
BY
*Thomas W. Brennan*
AGENT

Jan. 25, 1966  C. E. UPPER  3,231,223
FLIGHT ATTITUDE CONTROL SYSTEM
Filed Nov. 16, 1962  3 Sheets-Sheet 2

INVENTOR.
CHARLES E. UPPER
BY
Thomas W. Brennan
AGENT

Jan. 25, 1966  C. E. UPPER  3,231,223
FLIGHT ATTITUDE CONTROL SYSTEM
Filed Nov. 16, 1962  3 Sheets-Sheet 3

INVENTOR.
CHARLES E. UPPER
BY
Thomas W. Brennan
AGENT

United States Patent Office 3,231,223
Patented Jan. 25, 1966

3,231,223
FLIGHT ATTITUDE CONTROL SYSTEM
Charles E. Upper, Rockaway Boro, N.J., assignor to Thiokol Chemical Corporation, Bristol, Pa., a corporation of Delaware
Filed Nov. 16, 1962, Ser. No. 238,098
6 Claims. (Cl. 244—52)

This invention relates to flying bodies and more particular to flight attitude control systems for flying bodies wherein one or more sets of reaction motors are mounted on the body so as to effect attitude control thereof along a predetermined or programmed flight path. Currently preferred systems for the control of space craft, satellites, missiles, flying bodies and the like about their roll, pitch and yaw axes (major axes), comprise rocket or reaction motors so placed about or on the body, that operation of one or a set of motors tends to correct their position after a deviation or an indication of deviation is noted by an appropriate sensing device thereon.

Systems which attempt to accomplish the above with fewer than twelve force producing elements or rocket motors present a basic problem. When a deviation of the vehicle from its desired flight attitude has occurred, corrective action to re-establish the proper attitude usually involves a translation in the direction of the applied, corrective force prior to, or in conjunction with, a second motion such as rotation about one or more of the major axes. Such translatory motion must be counteracted by suitable forces since it necessitates a further corrective action to nullify or mitigate its effect. The result is that the vehicle describes a sinusoidal path of diminishing amplitude in the plane of the axis about which it is being controlled. Or, as this phenomeon is often referred to, the vehicle "hunts" and its actual flight path consists of several such "hunting" motions rather than the desired or programmed path.

It is accordingly an object of this invention to provide an attitude control system for flying bodies which is characterized by its ability to control the flight attitude of the flying body in its flight path while preventing it from undergoing unwanted translatory motions. A further object is to provide a flight attitude control system for flying bodies wherein such translational motions are eliminated or considerably reduced by operation of paired sets of rocket or reaction type motors mounted on the vehicle. A still further object of this invention is to provide a flight attitude control system for flying bodies wherein three pairs or sets of rocket motors are mounted on the flying body periphery and at least two of the motors fire rearwardly, (to produce a forwardly acting thrust) the remainder firing forwardly, (to produce as rearwardly acting thrust) and all act either singly or in conjunction with one another to effect minimization of translational force. The foregoing and other objects of the invention will become more fully apparent from the following detailed description of structure embodying the invention and from the accompanying drawings in which:

Figure 1:
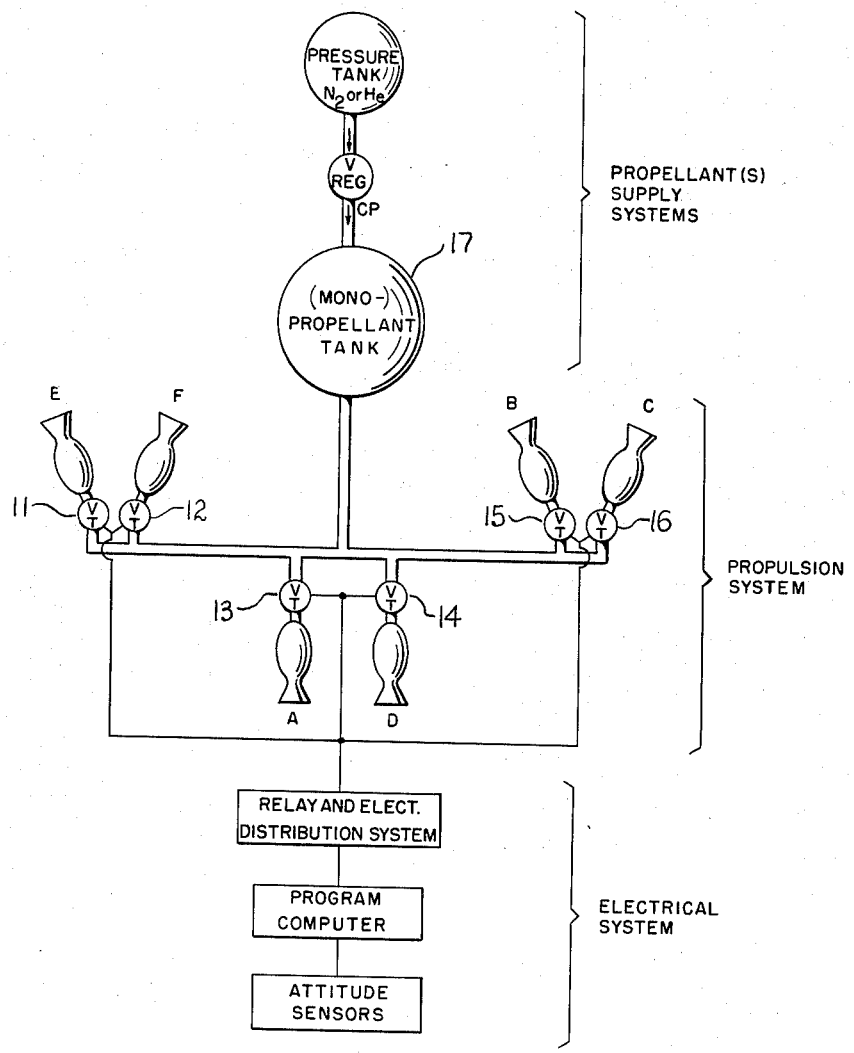
FIGURE 1 is a schematic of a control system embodying the invention.

With reference to the drawings, and especially to FIGURE 1, the invention set forth therein comprises: attitude sensors which sense any deviation of flying body 10 relative to any of its major roll (R—R), pitch (P—P) or yaw (Y—Y) axes from its predetermined attitude and/or flight path; programming devices or control computers for determining the flight path and the attitude of the body therein; a propellant storage and supply system; an electrical relay and distribution system; a propellant flow control system responsive to said electrical system; and a propulsion system for generation of forces and couples to control the flying body attitude and keep it on its correct flight path. The attitude sensors are usually accelerometers of a known-type, which indicate displacement rate changes of the body. Deviation between any of the datum attitudes built into the programming device and the actual attitude of the vehicle or flying body relative to any of the major axes as indicated by the sensors, generate or cause a control voltage to appear which is conducted through the relay box and/or electrical distribution system which may include amplifying devices such that signals are caused to be sent through the electrical lines to selected throttling valves 11 through 16 for operation thereof. Valves 11 through 16 are any known throttling type, and as exemplified herein, operate to permit proper amounts of fluid to flow from storage tank 17 to propulsive motors A through F for generation therein of high temperature gas to produce thrust.

Since valves 11 through 16 are throttling valves, motors A through F can be operated at various thrust levels, from full to any intermediate level. However, as will become clear from what follows, a step-thrust level operation capabiilty is most often desirable and usually sufficiently effective for most control purposes. Provision can be made to replace throttling valves 11 through 16 with three position valves or the equivalent, two parallel valves to achieve this latter type operation. In fact, any number of well known devices will come to mind for use in this part of the invention to one of skill in the art without departing from the spirit and scope thereof; for the invention herein is most concerned with a novel system of flying body mounted, reaction-type propulsion devices which develop thrust forces and pure couples which are applied to the body so uniquely, that a significantly greater increase in precision of attitude control thereof is achieved than heretofore was possible in the art.

Figure 2:
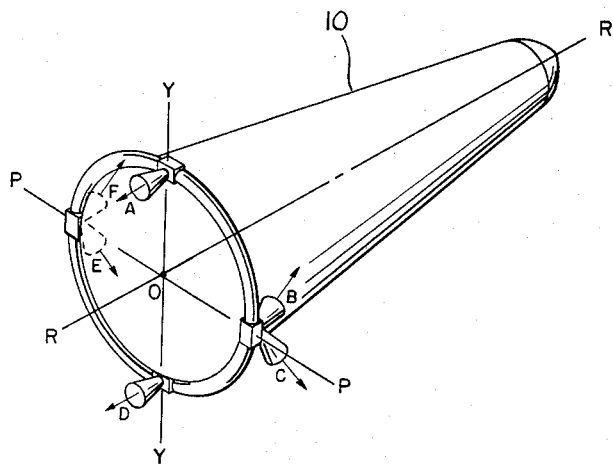
FIGURE 2 is a pictorial view showing in three dimensions the relative positions of the reaction motors on the flying body moving through space.

FIGURE 2 shows flying body or space vehicle 10 having, as noted above, three sets or pairs of rockets motors A, D; B, C; and E, F. Flying body 10 is considered to be moving on a path coincident with, or parallel to, major axis R—R. Also indicated are two additional, mutually perpendicular, axes, the pitch axis, P—P and the yaw axis, Y—Y. This invention is most concerned with controlling the motion of flying body 10 about each of these axes, especially wherein the body deviates in some manner from, or in, its flight path which must then be corrected as quickly and as efficiently as possible. In effecting this control, substantial weight savings in the thrust or force producing motors which must be carried aboard the flying body, so highly important in any space vehicle, is achieved.

In order to better comprehend the mechanics of this invention, reference to FIGURE 2 may be had wherein the relative orientation of the motors in pictorial form is shown, which consists (FIG. 1) of three major parts or systems, a propellant supply system, a propulsion system and the electrical, or guidance system. Further, it should be pointed out that a couple is a couple regardless of how or where it is applied to a body. Corollary to this is the fact that in order to control body 10 in the most precise way, torques or couples about the axes referred to must be created. The rocket motors A, B, C, D, E and F are thus used in specific combinations to create these torques or couples.

Figure 3:
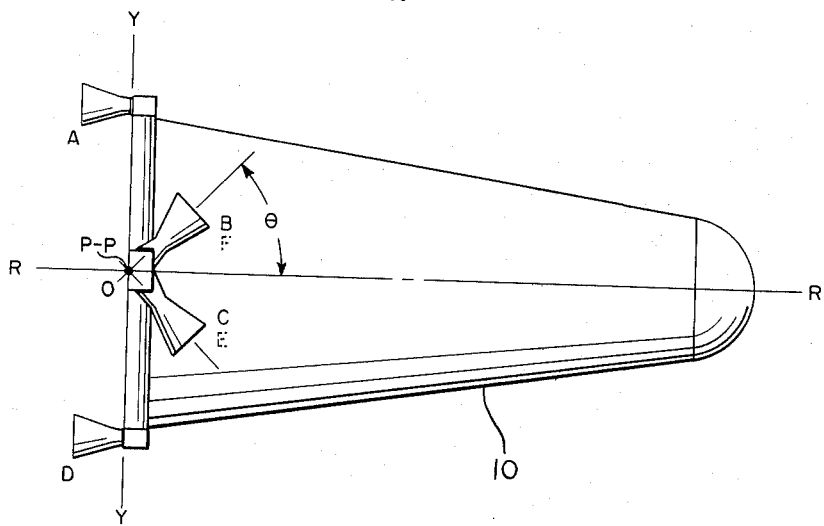
FIGURE 3 is a side elevation of the flying body of FIG. 2 showing relative positions of the reaction motors comprising the invention, and the angular orientation of the forwardly firing motors.
Figure 4:
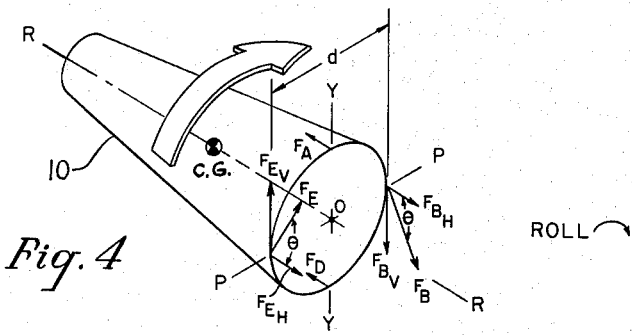
FIGURES 4, 5 and 6 represent free body diagrams showing a sample result of applying the invention when used to control a flying body about its roll, pitch and yaw axes respectively.
Figure 5:
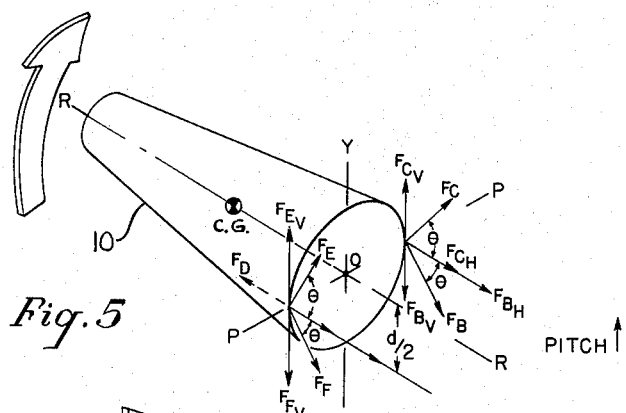
Figure 6:
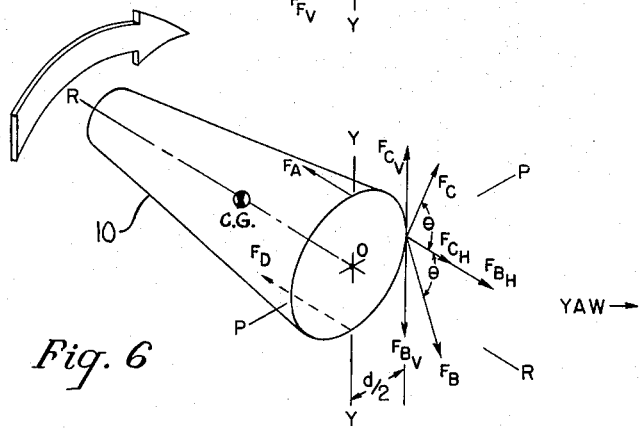

In order to better comprehend the operation of the invention reference is made to FIGURES 4, 5 and 6, wherein is shown in diagrammatic form corrective motions or maneuvers about each of the major axis, R—R (FIG. 4) P—P (FIG. 5) and Y—Y (FIG. 6). For purposes of explanation it will be assumed that corrective action and/or a desired maneuver about the axis specified is to be instigated as a result of a signal generated by the attitude sensing system indicating a specific maneuver to be necessary to correct the attitude of the body. In each of FIGURES 4, 5 and 6 rocket motors A through F are represented by their individual thrust vectors, $F_A$ through $F_F$. As indicated above the invention relies upon the production, or application, of forces and couples for corrective action about each of the axes. Therefore, as shown in FIGURE 4 a clockwise (from the right hand of FIGURE 4) rotation is being performed about the roll axis, R—R. To accomplish this maneuver, certain combinations of rockets are fired and forces developed. Since it is desirable to roll the body 10 about R—R in such a way that minimal translation to the right is induced, rockets A, D and B, E are operated producing thrust represented by vectors $F_A$, $F_D$, $F_B$ and $F_E$. Rockets A and D fire rearwardly as indicated in the figure (of course it should be realized that the thrust force acts in a direction opposite to the direction of firing as is always the case with reaction motor type devices). For reasons which will be later explained, rockets A and D are operated at 50% thrust. Rockets B, E, which are mounted on body 10 periphery have their thrust vectors angularly separated by angle $2\theta$ with ($\theta$ being the angles of inclination and declination, respectively, between motors B and E and the R—R axis—see FIG. 3) and operate for this maneuver at 100% or twice the thrust level of A and D. In addition, rockets B and E fire forwardly, (note their thrust vectors, $F_B$ and $F_E$, are directed oppositely or rearwardly as shown in the figure). For convenience these thrust vectors are each resolved into two components, one component $F_{BV}$, $F_{EV}$, respectively in a plane parallel to the plane indicated by R—O—Y, and one component, $F_{BH}$ and $F_{EH}$ respectively in a plane coincident with or parallel to the R-O-P plane. Since angle $\theta$ is set equal to 60° the vector components $F_{BH}$ and $F_{EH}$ in plane R-O-P are numerically equal in value to $F_B$ or $F_E$ multiplied by the cosine of 60°; or $F_{BH} = F_B$ cos 60°, and $F_{EH} = F_E$ cos 60°. Further since cos 60° is equal to ½, the forces, $F_{BH}$ and $F_{EH}$ which are directed rearwardly (oppositely), but parallel, to the forces developed by rockets A and D, or $F_A$ and $F_D$, are equal to $F_B/2$ and $F_E/2$. However, since rockets A and D were fired at 50% thrust, and rockets B and E were fired at 100% thrust, it is apparent that the rearwardly directed thrust components B and E are equal and opposite to the thrusts of A and D, and therefor insofar as the effect on the body is concerned, cancel each other. It is further apparent, that since $F_A$ and $F_D$ cancel the effects of the rearwardly directed components of $F_B$ and $F_E$ that the only forces acting on the body to produce motion of any kind, are the components of $F_B$ and $F_E$ which are in the P-O-Y plane (perpendicular to the P—P axis in FIGURE 4). Examination of these forces will show that they represent a pure couple, the moment of which is equal to the value of either of the forces (designated in the figure as $F_{BV}$ and $F_{EV}$ and which are equal and oppositely directed) multiplied by the distance (equal to the diameter of body 10, $d$) between them, i.e., $F_{BV} \cdot d$, or $F_{EV} \cdot d$. The only motion producible by this set of forces comprising the couple above mentioned, is roll about the R—R axis.

Similarly to produce a pitching motion about the P—P axis, which as shown in FIGURE 5 is a clockwise motion when viewed from the left hand end of the P—P axis, rocket motors B, C, E, F and D are operated. For reasons which will later become apparent, rockets B, C, E and F operate at 50% thrust while rocket motor D operates at 100% thrust. Again, as in FIGURE 4, these forces are resolved to forces acting in planes parallel to planes P-O-Y and R-O-P which results in forces $F_{BV}$, $F_{CV}$, $F_{EV}$ and $F_{FV}$ in the former plane and forces $F_{BH}$, $F_{CH}$, $F_{EH}$ and $F_{FH}$ in the latter plane. Examination of the FIGURE 5 force system indicates that those forces in the P-O-Y plane cancel each other insofar as their effect on body 10 is concerned, and only those forces in the R-O-P plane remain. Resolution is again the result of the angular relationship established by the method of mounting rocket B, C, E and F as in FIGURE 4.

Since motors B and F fire forwardly and upwardly and have their corresponding thrust vectors directed oppositely, or downwardly and rearwardly, then their downward components ($F_{BV}$, $F_{FV}$) in the lower part of plane P-O-Y are directly equal and opposite to the upward components ($F_{CV}$, $F_{EV}$) of the forces developed by the C and E motors, which forces act in the upper part of plane P-O-Y. These forces, as noted above, cancel, and the only forces remaining to act on the body are the components ($F_{BH}$, $F_{CH}$, $F_{EH}$ and $F_{FH}$) of rockets B, C, E and F which are acting in the R-O-P plane. These forces all act rearwardly and directly opposite to the force ($F_D$) developed by motor D which acts forwardly in the R-O-Y plane. However force, or thrust, $F_D$ line of action is displaced from forces $F_{BH}$, $F_{CH}$, $F_{EH}$ and $F_{FH}$ by a distance equal to ½ the diameter ($d/2$) as shown in FIGURE 5, and since, as previously stated, rockets B, C, E and F are operated at 50% thrust and rocket D is operated at 100% thrust, the resolution of the forces described results in a single cumulative force in the R-O-P plane equal and opposite to $F_D$. Therefore, a pure couple is evolved which acts in the R-O-Y plane to rotate body 10 about an axis parallel to the P—P axis, which axis contains the C.G. (Center of Gravity) of body 10, as shown in FIGURE 5. The moment of the couple producing this maneuver is equal to $F_D$ times ½ the diameter ($d/2$). Numerically this moment is represented by $(F_{CH} + F_{BH} + F_{EH} + F_{FH}) \cdot d/2$ or, $(F_D) \cdot d/2$.

Similar analysis of the maneuver indicated in FIGURE 6 will show that forces derived from thrust developed by rocket motors B, C and A, D and applied to the body 10 will produce a maneuver or rotation about the Y—Y or yaw axis or more specifically about an axis parallel thereto which contains the C.G. of body 10. For yaw control, rocket motors A, D and B, C are fired simultaneously. In this instance rockets A and D are operated at 50% thrust whereas rocket motors B and C are operated at 100% thrust. Again the resultant force of A and D acts forwardly as shown whereas the resultant thrust of B and C acts rearwardly and at an angle $\theta$ (of 60°) above and below the R-O-P plane. Resolving these forces as before there remain compounds $F_{BV}$ and $F_{CV}$ acting in the P-O-Y plane equal and opposite to each other. They therefore, insofar as any effect on body 10 is concerned cancel, leaving a pair of forces acting rearwardly in the P-O-R plane (or a plane parallel thereto). There results again a pure couple having forces $F_A$ and $F_D$ acting forwardly and $F_{BH}$ and $F_{CH}$ acting rearwardly. This couple produces a clockwise maneuver about an axis parallel the Y—Y (or yaw) axis when viewed from above the R-O-P plane. The moment of the couple producing this motion is one of the total forces in either direction multiplied by its distance from its equal and opposite (total) counter part. Or, numerically this can be represented by $(F_A + F_D) \cdot d/2$ or $(F_{BH} + F_{CH}) \cdot d/2$.

As seen from the illustrative examples set forth in the previous paragraphs, any motion, maneuver, deviational correction or any combinations thereof of the body can be achieved through the use of the herein described invention. Therefore, as shown in Table I below, by properly selecting the rocket motor firing combinations and the operational thrust levels which can be obtained by means of values 11 through 16 or combinations thereof to control motors A through F, any conceivable maneuver of body 10 can be achieved in a precise and unique fashion. It is of course conceivable that where pure translation is desirable, such as occurs when body 10 must be shifted from one flight path to a new flight path this too can be accomplished by use of this invention. In this instance it is only necessary to fire one or a discrete selection of motors, after orienting or adjusting the attitude of body 10, until the proper heading is desired, to achieve a straight line maneuver in the direction of the thrust applied. This translation can be halted at will after reorienting body 10 in attitude and applying the proper thrust by selectively operating one or more of motors A through F.

*Table I*

| Type of Maneuver | 50% Thrust | 100% Thrust |
| --- | --- | --- |
| Roll (clockwise) | A, D | B, E. |
| Roll (counter clockwise) | A, D | C, F. |
| Pitch (downward) | B, C, E, F | A. |
| Pitch (upward) | B, C, E, F | D. |
| Yaw (right hand) | A, D | B, C. |
| Yaw (left hand) | A, D | E, F. |

Having thus describe the invention and its operation, it can be seen that what is presented herein is basically a six-rocket motor system wherein by proper selection of firing sequence thereof, any possible maneuver of a flying body in a flight path in outer space can be achieved. Heretofore to achieve this degree of control precision and maneuverability, it was usually necessary to operate as many as twelve thrust producing unit. The sequencing of the rocket motors herein is achieved through the combination of attitude sensors, program computer and the electrical relay and distribution system as stated previously. Thus, it is well within the state of the art for a missile to sense a change or deviation in its position and/or attitude such that proper numbers of rocket motors and control valves can be signaled through a relatively simple electrical distribution system operating in response to a computer or programming device, to open the proper amount and permit propellant to be combusted in the pre-selected rocket motor for the production of thrust therein. Of course, it is also contemplated that swivelling these rockets or mounting them so that they are movable in their mountings, can also be achieved without departing from the scope herein.

It is apparent that the motive fluid, or propellant, provided can be, as shown in FIGURE 1, catalytically decomposed monopropellant; however a bipropellant system is also applicable. Thus, by including necessary extra tankage, fluid lines and valves, a second propellant can be supplied to the motors A through F and controlled by other valves (not shown) similar to valves 11 through 16. Of course ignition systems or hypergolic propellant combinations can be used to achieve combustion therein. Many such rocket motors and rocket motor systems are available for these purposes and are not part of the invention below claimed. This invention is primarily concerned with the arrangement of the motors such that certain ones fire forwardly while others fire rearwardly in such combinations that the elimination of translation in any direction is achievable. Further, this results in the production of forces and pure couples and moments thereof wherein maneuvers of almost any conceivable type and about any of the three major axes are achieved with significant savings in flight system component weight and hardware.

It is also noted that a process for controlling the attitude of a flying body such as body 10 in its established flight path is herein presented which provides or comprises mounting or arranging a group of rocket motors on or about said flying body such that at least two of these motors are adaptable for firing in a rearward direction (to produce a forward thrust), mounting or arranging at least two more rocket motors on the flying body such that they are angularly disposed and adapted to be fired substantially forwardly (to produce a substantially rearward thrust) and mounting or arranging two more rockets on said body oppositely to said second pair such that they are also angularly disposed and adapted to be fired forwardly (to produce a rearward thrust) said last pair and said other motors cooperatively controlled and operated to produce precise control of said body attitude about any or all of its major axes and/or parallel axes containing the body C.G.

Having thus described what is considered to be a preferred embodiment of this invention will be apparent to those skilled in the art that various changes and modifications may be made herein without departing from the spirit of the scope of the invention.

What is claimed is:

1. A flight attitude control system for a flying body comprising a first pair of rocket motors mounted on the outer periphery of said body and adapted to fire rearwardly, a second pair of rocket motors on said body outer periphery coplanar with said first pair and adapted to fire substantially forwardly, a third pair of rocket motors on said body outer periphery, coplanar with said first and second pairs, adapted to fire substantially forwardly and positioned diametrically opposite said second pair, at least one propellant combustible in said rocket motors, means for supplying said rocket motors with said propellant, said supply means including means for throttling said rocket motors from full thrust to half thrust, and said rocket motors selectively operable singly and together to effect flight attitude control of said flying body about each of said body major axes.

2. A flight attitude control system for a flying body comprising a plurality of reaction motors, said reaction motors mounted on said flying body about its center of gravity, a first pair of said reaction motor plurality positioned diametrically opposite each other and adapted to fire rearwardly, a second pair of said motor plurality positioned together on said body periphery and adapted to fire in a forward direction, a third pair of said motor plurality positioned together on said body periphery diametrically opposite to said second pair and adapted to fire in a forward direction, means for supplying propellant to said motor plurality, control means in said supply means for controlling the flow of propellant to said motor plurality, electrical means in said flying body for operating said control means, and sensing means in said flying body responsive to deviational motions of said body about it major axes.

3. The flight attitude control system of claim 2 wherein said control means are three position valves.

4. The flight attitude control system of claim 2 wherein said forwardly firing motors are mounted in pairs such that each motor on each of said pairs has its thrust line of action angularly disposed with respect to the other motor of said pair.

5. The flight attitude control system of claim 4 wherein said angular disposition is 120°.

6. The flight attitude control system of claim 2 wherein said control means are parallel dual valves.

References Cited by the Examiner
UNITED STATES PATENTS

| | | | |
| --- | --- | --- | --- |
| 2,395,435 | 2/1946 | Thompson et al. | 244—52 |
| 2,943,822 | 7/1960 | Hamilton | 244—52 X |
| 3,093,346 | 6/1963 | Faget et al. | 244—1 |

MILTON BUCHLER, *Primary Examiner.*

ANDREW H. FARRELL, *Examiner.*